Patented Aug. 5, 1924.

1,504,061

UNITED STATES PATENT OFFICE.

LUCAS P. KYRIDES, OF BUFFALO, NEW YORK, ASSIGNOR TO NATIONAL ANILINE & CHEMICAL COMPANY, INC., OF NEW YORK, N. Y., A CORPORATION OF NEW YORK.

DIPHENYLNAPHTHYLMETHANE DYES.

No Drawing. Application filed October 21, 1922. Serial No. 596,150.

*To all whom it may concern:*

Be it known that I, LUCAS P. KYRIDES (whose name was changed by judicial decree from LUCAS P. KYRIAKIDES), a citizen of the United States, residing at Buffalo, in the county of Erie, State of New York, have invented certain new and useful Improvements in Diphenylnaphthylmethane Dyes; and I do hereby declare the following to be a full, clear, and exact description of the invention, such as will enable others skilled in the art to which it appertains, to make and use the same.

This invention relates to new dyes which belong to the diphenylnaphthylmethane series and which are of value for dyeing silk, wool, mordanted cotton, and other fibres or fabrics. The new dyestuffs are also capable of forming lakes. The invention includes also the dyed fabrics, or other material, dyed with the new dyestuffs.

The new dyestuffs can be obtained by the condensation of tetraalkyldiaminobenzophenone with N-hydroxyethyl-alpha-naphthylamine in presence of phosphorus oxychloride, and with or without the presence of an inert solvent or diluent. The new dyestuffs have the following probable formula:

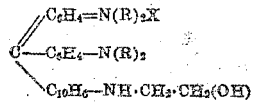

in which R denotes an alkyl radical such as methyl, ethyl, propyl, etc., and X denotes an acid radical such as chloride, sulfate, etc.

The following specific example will illustrate the invention, but it is understood that the invention is not limited thereto. The parts are by weight.

Example: 150 parts of dry and finely powdered tetramethyldiaminobenzophenone is thoroughly stirred with 70 parts of dry toluene until a well mixed and comparatively uniform paste is formed. 100 parts of phosphorus oxychloride is then added to the paste and the mixture, which is kept constantly stirred, is surrounded by a bath maintained at a temperature of about 60° C. The temperature of the mixture, due to the reaction which sets in, spontaneously rises to a temperature above that of the bath, and at about 80° C. the comparatively fluid reaction-product changes more or less quickly to a crystalline mass. The stirring is continued and the temperature allowed to drop to that of the bath which is now cooled to about 30° C. 115 parts of dry and pulverized N-hydroxyethyl-alpha-napthylamine is then added and the mixture thus obtained is kept constantly stirred. After the reaction, which sets in and which manifests itself by a considerable rise of temperature, gradually begins to subside, the temperature of the bath is raised rapidly to about 100° C. The temperature of the reaction mixture rises with that of the bath and continues to rise somewhat above that of the bath due to the heat of reaction, and then gradually subsides again to that of the bath. The product puffs or swells up and assumes a tough dough-like consistency. It is maintained at a temperature of 95–100° C. for 45–60 minutes, or until the reaction is complete. 2000 parts of water are then added and the resulting mixture heated by passing steam through it until the dyestuff assumes a more or less crystalline state. 2000 parts of cold water are then added and the mixture agitated until it has cooled to room temperature. The dyestuff is then filtered off, washed with cold water and purified, if desired, by dissolving it in hot water, filtering, and salting out the dyestuff from the filtrate, whilst stirring, by the addition of common salt.

The new dyestuff thus produced has the following probable formula:

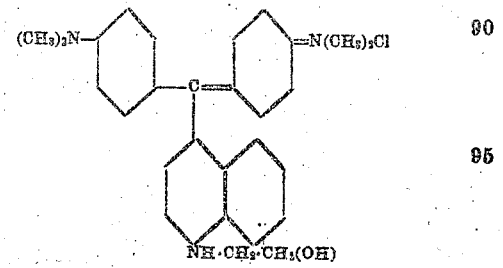

and constitutes, in the dry and powdered state, a greenish powder with a bronze-like lustre, which is almost insoluble in cold water and sparingly soluble in hot water to give blue solutions which upon addition of caustic soda produce brownish precipitates. It is soluble in concentrated sulfuric acid to give reddish-brown solutions which upon gradual dilution with water change to a yellow, then green and finally to a blue color, the dye remaining in solution. It dissolves in alcohol or acetic acid to a blue solution. It dyes wool, silk or cotton mordanted with tannic acid and produces in general blue shades which are fast to washing and to fulling. The shades produced are somewhat more reddish than those produced by the coloring-matter known in commerce as Victoria blue B. A similar result is obtained if, in the above example, the tetramethyldiaminobenzophenone is replaced by the equivalent quantity of tetraethyldiaminobenzophenone.

The dyed materials produced by the action of the dyestuffs themselves or lakes thereof on the fibre or fabric, as well as the new dyestuffs themselves or lakes thereof, form a part of the present invention.

I claim:

1. The process of making new diphenylnapthylmethane dyes which comprises the condensation of approximately equal molecular proportions of tetraalkyldiaminobenzophenone and N-hydroxyethyl-alpha-naphthylamine in the presence of phosphorus oxychloride and an inert diluent.

2. As new products, the herein described new dyestuffs having the following probable formula:

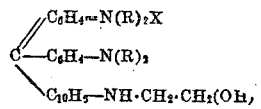

in which R denotes an alkyl radical such as methyl, ethyl, etc. and X denotes an acid radical such as chloride, sulfate, etc., said products, in the dry and powdered state, being of a greenish color with a bronze-like lustre, sparingly soluble in water, soluble in alcohol to give blue solution, and soluble in concentrated sulfuric acid (66° Bé.) to give reddish-brown solutions which upon gradual dilution with water change to a yellow, then green and finally, to a blue color; and dyeing silk, wool, and mordanted cotton, blue shades.

3. As a new product, the herein described new dyestuff having the following probable formula:

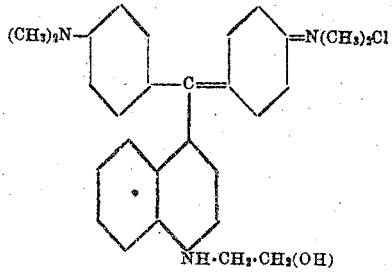

said o e, in the dry and powdered state, being of a greenish color with a bronze-like lustre, sparingly soluble in water to give a blue solution which upon the addition of caustic soda gives a brownish colored precipitate, soluble in alcohol and in acetic acid to give blue solutions, soluble in concentrated sulfuric acid (66° Bé.) to give a reddish-brown solution which upon gradual dilution with water changes first to a yellow, then to a green, and finally to a blue color; and dyeing silk, wool, and cotton mordanted with tannic acid and tartar emetic, blue shades.

4. Materials dyed with the new dyestuffs of claim 2.

5. Materials dyed with the new dyestuff of claim 3.

In testimony whereof I affix my signature.

LUCAS P. KYRIDES.